US005567230A

United States Patent [19]
Sinclair

[11] Patent Number: 5,567,230
[45] Date of Patent: Oct. 22, 1996

[54] AIR FILTER FOR USE WITH AIRCRAFT VENTILATION SYSTEMS

[76] Inventor: Hugh J. Sinclair, 30 Palmer Green, Baltimore, Md. 21210

[21] Appl. No.: 416,973

[22] Filed: Apr. 5, 1995

[51] Int. Cl.⁶ .................................................. B01D 46/00
[52] U.S. Cl. .......................... 95/273; 55/385.1; 55/503; 55/504; 55/505; 454/76; 454/154; 454/158
[58] Field of Search .................... 59/385.1, 385.2, 59/385.3, 503, 504, 212, 468, 467, 505; 454/76, 152, 154, 158, 162, 163; 95/273

[56] References Cited

U.S. PATENT DOCUMENTS

| 2,316,237 | 4/1943  | Grunert et al. | 55/385.2 |
| 2,516,805 | 7/1950  | Rother et al.  | 454/76   |
| 2,885,943 | 5/1959  | Divizia        | 454/154  |
| 3,113,502 | 12/1963 | Kallel et al.  | 454/76   |
| 3,458,977 | 8/1969  | Young et al.   | 55/503   |
| 3,542,942 | 11/1970 | Muella         | 454/76   |
| 3,686,835 | 8/1972  | Strange et al. | 55/503   |
| 4,148,732 | 4/1979  | Burrow et al.  | 55/503   |
| 4,493,247 | 1/1985  | Wachsman       | 55/385.3 |
| 4,883,507 | 11/1989 | Rey et al.     | 55/503   |
| 5,127,876 | 7/1992  | Howe et al.    | 454/76   |
| 5,328,152 | 7/1994  | Castle         | 454/76   |

Primary Examiner—Jay H. Woo
Assistant Examiner—Duane S. Smith
Attorney, Agent, or Firm—Aquilino & Welsh

[57] ABSTRACT

An air filter unit for use with an air ventilation control nozzle in the cabin of an aircraft. The air filter unit includes a housing containing a filter medium, wherein the filter medium has a first side and a second side. The housing includes an inlet port positioned on the first side of the filter medium and an outlet port positioned on the second side of the filter medium, wherein the inlet port includes a connecting member dimensioned to snugly fit over the circumference of the ventilation control nozzle.

14 Claims, 6 Drawing Sheets

AIR FILTER FOR USE WITH AIRCRAFT VENTILATION SYSTEMS

BACKGROUND OF THE INVENTION

The present invention relates to air filter units for personal use and, in particular, to an air filter unit suitable for filtering the air directed to an individual seated on an aircraft.

Aircraft include a central air ventilation and filtering system which supplies all the passengers with a combination of recycled cabin air and fresh air taken in from the manifolds of the engines. These systems have the shortcoming of recycling pollutants and other irritants throughout the cabin. Since the tolerance level among passengers is quite variable, there exists a need for better filtration systems at least on an individual basis. Furthermore, when flying millions of passengers, 517 million U.S. bookings in 1994 alone, it is impossible to isolate or screen passengers who are sick or have health problems which may be transmittable to fellow travelers. By way of example, it was recently disclosed that a tuberculosis victim was aboard an international flight and four passengers did in fact become infected with tuberculosis.

Although the aircraft builders and the Federal Aviation Authority (FAA) set forth certain guidelines as to an aircraft's filter system, including the frequency between filter medium changes and cleaning valves and ducts, airlines often alter the schedule to suit their own standards and economies. Air filters for aircraft ventilation systems cost upwards of three hundred dollars each and each thorough cleaning of the aircraft's ducts and valves effectively reduces the amount of time an aircraft could be generating income. As a result, passengers do not always receive the very best air quality. The dangers of second hand smoke have been well documented, but it has only been within the recent past that smoking has all but been eliminated on domestic flights. Tobacco is obviously detected because of its smell. However, germs are colorless, odorless and create an even greater danger than tobacco smoke.

Examples of existing air filtering systems include passive filters which are inexpensive disposable filters found mainly in home heating and cooling systems. Other filters include electrostatic passive filters which create a static electrical charge to trap material passing through. Additionally, electrostatic precipitators use wires to electrically charge particles passing through the filter which are then attracted to polarized plates that act as magnets.

In addition, facial protection masks are available, such as dust and pollen masks, surgical masks and the like, it is not uncommon to see airline passengers wearing such masks when travelling in a closed air environment aircraft. Whereas these help prevent the spread of infectious bacteria and airborne germs caused by sneezing, coughing and other airborne viruses, their use is usually somewhat clumsy and restrict breathing, eating and conversing.

There is increased emphasis by the U.S. Surgeon General Office and The Environmental Protection Agency (EPA) to improve our health and clean up our air. Their goal is to make all public halls, buildings and confined spaces (this would include aircraft) as safe as possible from air-borne contaminants.

At the present time, there are no international or U.S. Governmental testing guidelines for air filters or their medium. However, the industry at large accepts the American Society for Heating Refrigeration and Air Conditioning (ASHRAE) testing procedures.

The results of ASHRAE 52.1 dust spot tests are reported in two distinct values, atmospheric dust spot efficiency and synthetic weight arrestance. Arrestance testing is mainly used by passive filter manufacturers to measure large (100 micron plus) dust particles (participates). However, ASHRAE 52.1 dust spot efficiency testing relates to the filter's meaningful ability to remove low micron to submicron size contaminants and bacteria.

The three levels of ASHRAE 52.1 dust spot efficiency are: low efficiency, which is less than 20 percent, medium efficiency, which is 25–60 percent, and high efficiency, which is 85–95 percent.

True high efficiency filter mediums are not cleanable. Once these filters load with contaminants, the restriction to air flow increases and necessitates timely filter changes before it becomes critical. The present invention contemplates the use of high efficiency filter mediums. Consequently, the present air filter unit must be manufactured to be disposable or contain an easy means for filter replacement.

In view of the shortcomings of filtering systems currently in use in aircraft, a need exists for a supplemental air filter that can conveniently be used aboard aircraft. The present invention provides such a filter.

SUMMARY OF THE INVENTION

The present invention is directed to a disposable air filter unit. The filter is designed to be placed directly over and temporarily secured to the air control nozzle. Air control nozzles provide an adjustable stream of air over a passenger and are generally located above each passenger seat at the underside of the carry-on bin as part of the passenger support unit (PSU). The PSU generally includes reading lights, emergency oxygen masks and air flow control nozzles.

The present air filter unit includes a housing which is preferably compact and made of plastic. The housing includes two generally conically shaped housing members with flanged lips at one end. The housing also respectively includes air inlet and outlet ports centered at their respective upper and lower ends. The filter medium is an ASHRAE high efficiency rated polypropylene, or its equivalent that is permanently electrostatically charged. It is shaped and sized to be held on its circumference by ledges positioned within the interior of the housing members.

When the air filter unit is positioned over the air control nozzle, central ventilation air is then forced through the air control nozzle, the inlet port and then through the filter medium. The filtered ventilation air is then forced out of the outlet port and flows downward in a conical stream over the passenger. The Federal Aircraft Authority (FAA) has rules concerning air flow within the cabin. The FAA states that all air control knobs must be in working order. In addition, the standard in the industry is that when the knob is turned fully open, air must flow at a measured 2 in. of water at 3 standard cubic feet per minute (SCFM). A passenger may attach his own personal, disposable air filter to the air control knob and fly protected and unincumbered in an umbrella-like barrier zone of the highest possible air quality.

Among the objects of the present invention are the provision of a disposable, inexpensive air filter unit specifically designed for use with an aircraft ventilation system.

Another object of the present invention is the provision of an air filter unit designed to provide a supplemental filter arrangement in an aircraft to upgrade the quality of the air an individual passenger is exposed to.

A still further object of the present invention is the provision of a filter unit which may be selectively and inexpensively used by individual passengers.

Other objects and advantages of the present invention will become apparent from the following detailed description when viewed in conjunction with the accompanying drawings, which set forth certain embodiments of the invention.

BRIEF DESCRIPTION OF THE DRAWINGS

FIG. 6b is a perspective view of the filter medium used in conjunction with the circular embodiment shown in FIG. 6a.

DETAILED DESCRIPTION OF THE PREFERRED EMBODIMENT

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 5:
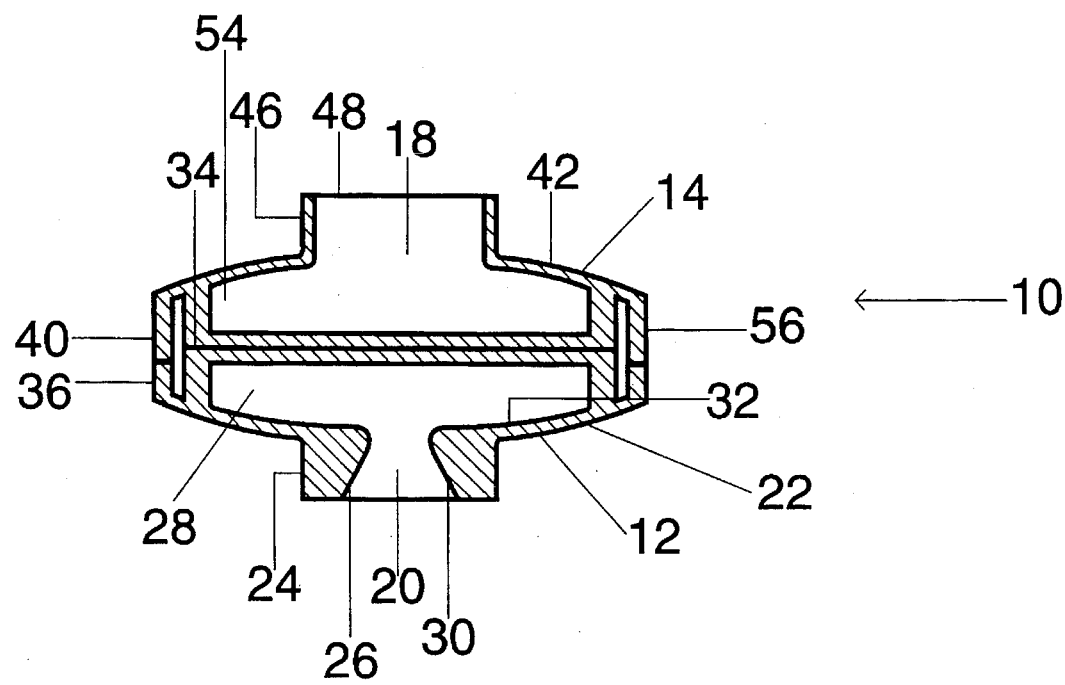
Figure 6A:
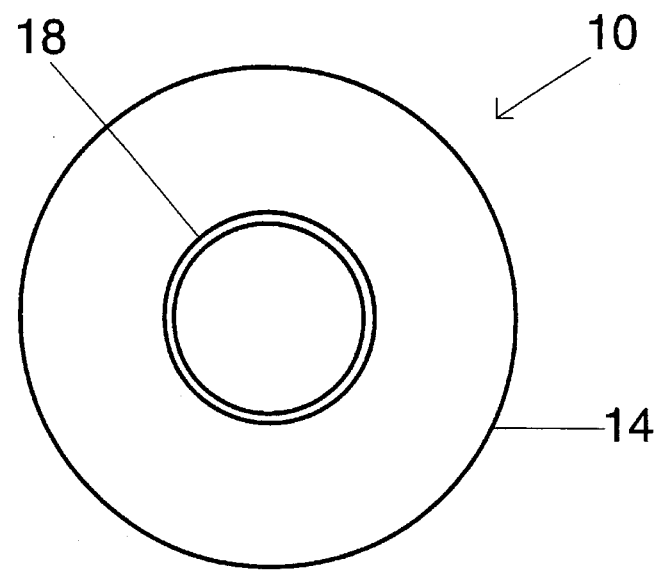
FIG. 6a is a top view of an alternate embodiment of the present air filter unit.
Figure 6B:
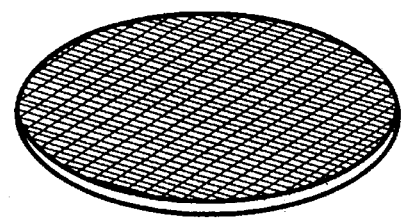
Figure 6C:
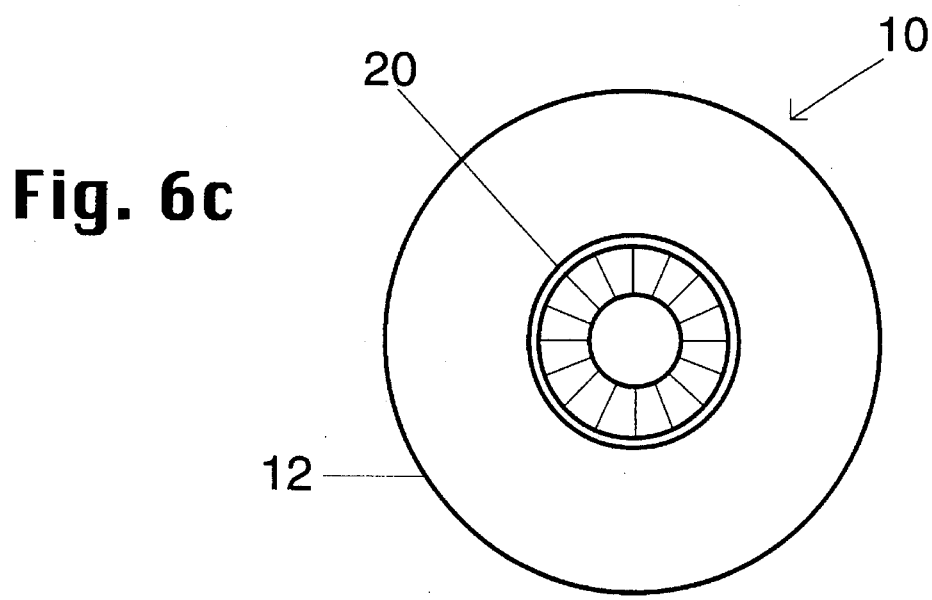
FIG. 6c is a bottom view of the alternate embodiment shown in FIG. 6b.
Figure 6D:
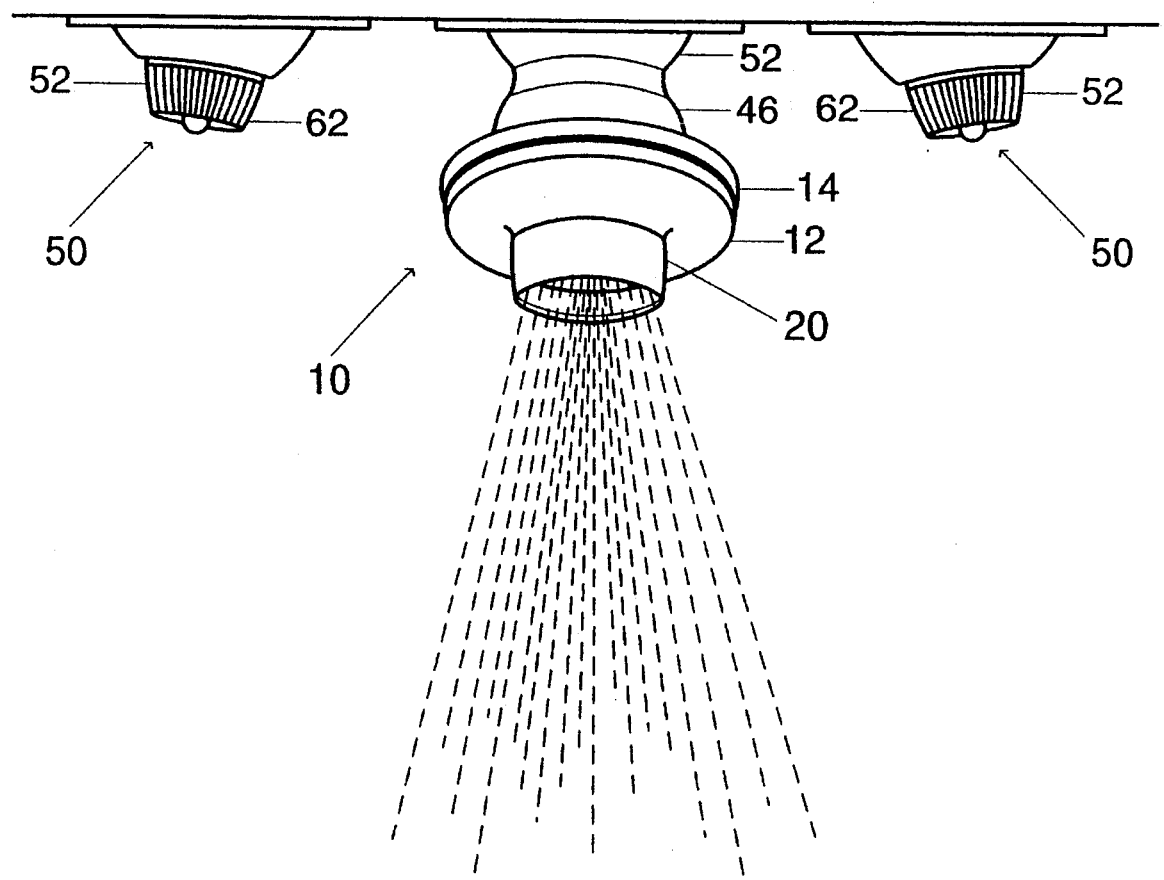
FIG. 6d is a perspective view of the circular embodiment shown in FIG. 6c, showing the filter in use.

Referring to the drawings, an air filter unit 10 constructed from a first housing member 12, a second housing member 14 and a filter medium 16 is disclosed. The filter medium 16 is stored within the first housing member 12 and the second housing member 14 when the two housing members are engaged as shown in FIG. 5. The filter medium 16 is preferably an ASHRAE high efficiency rated polypropylene, or its equivalent that is permanently electrostatically charged. It is shaped and sized to be held on its circumference by the ledges 34 and 56 located in the interiors of the housing members. Consequently, air forced through the inlet port 18 of the second housing member 14 is forced through the filter medium 16 and out the outlet port 20 of the first housing member 12.

Figure 1:
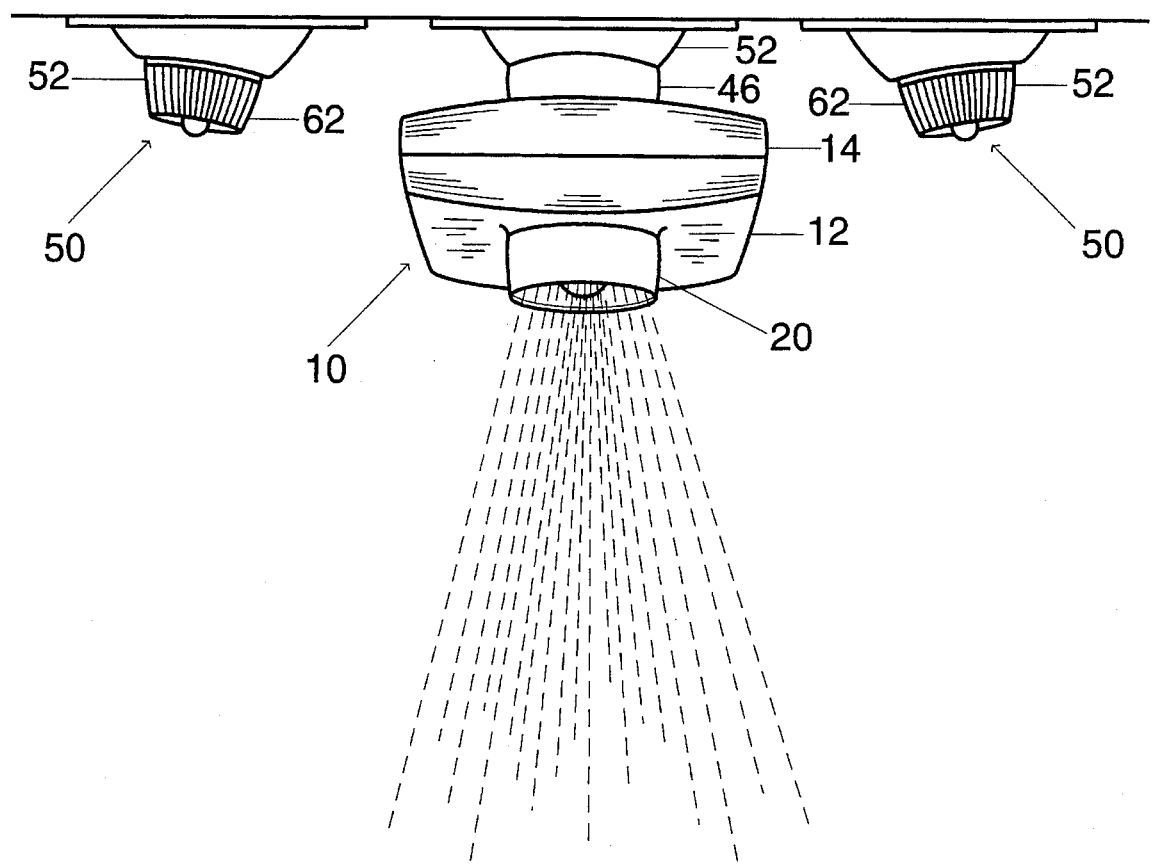
FIG. 1 is a side view of the air filter unit in use.
Figure 2:
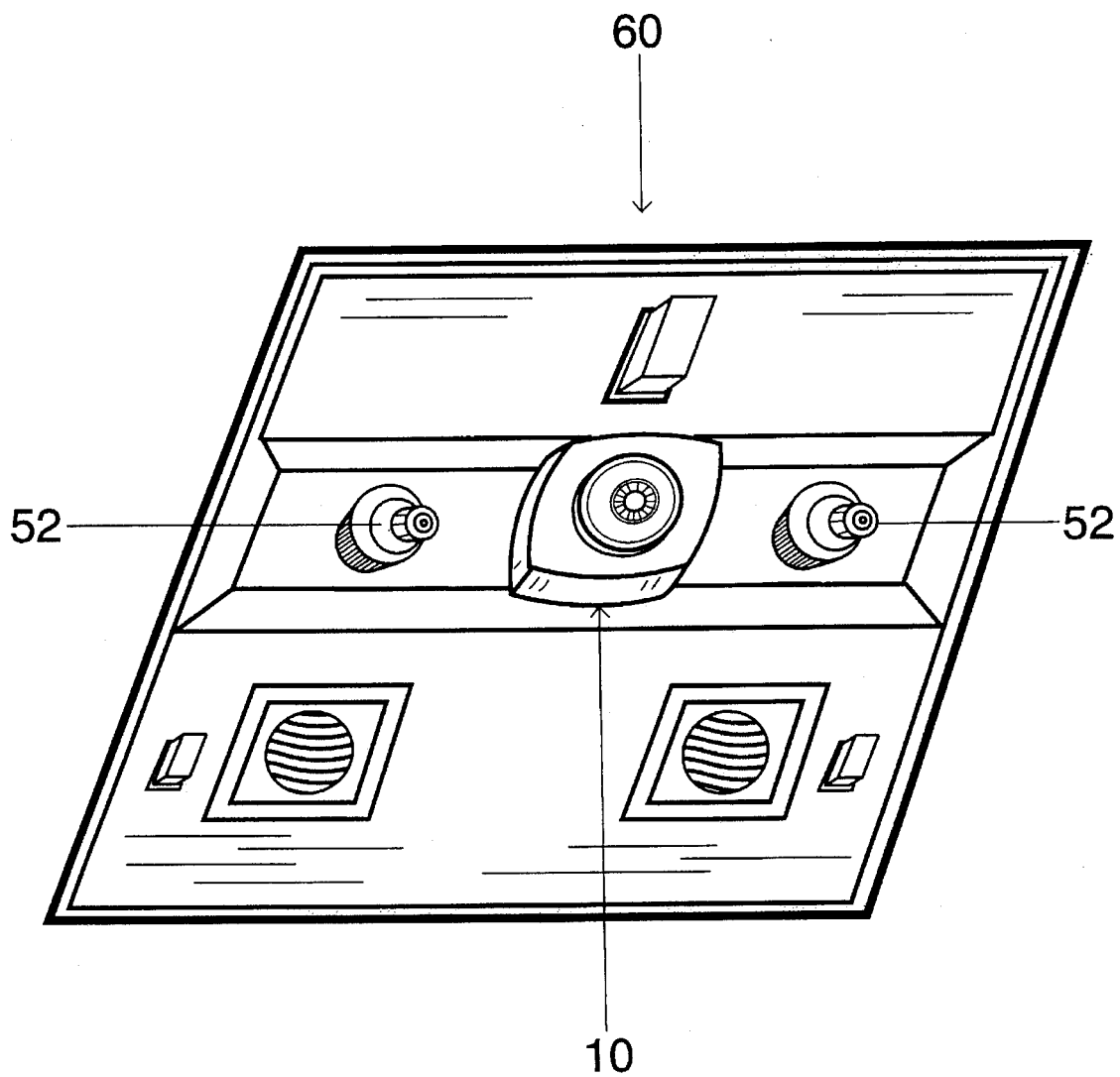
FIG. 2 is a perspective view of the air filter unit secured to the ventilation control nozzle of the passenger support unit.
Figure 3:
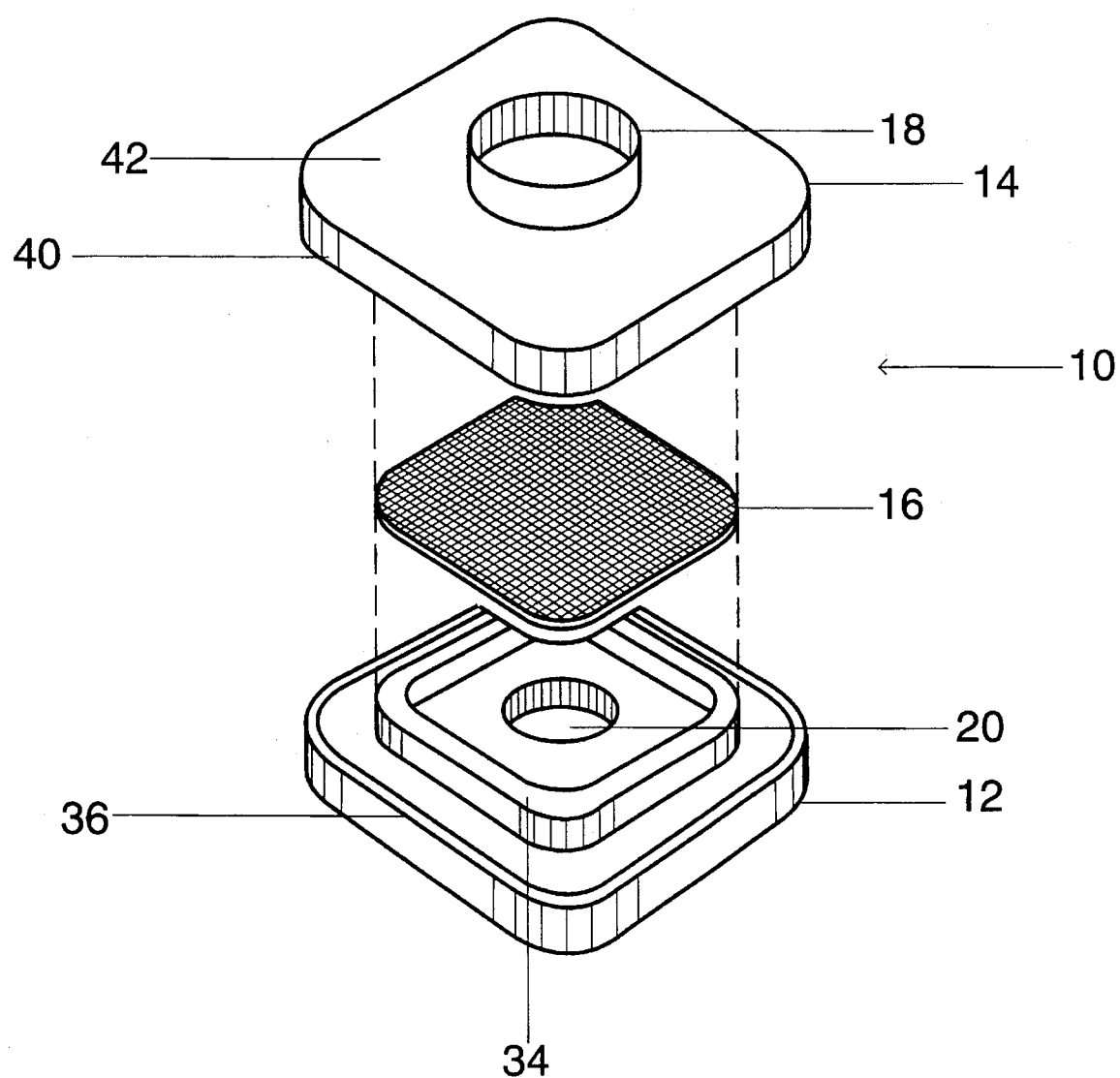
FIG. 3 is an exploded perspective view of the air filter unit.
Figure 4:
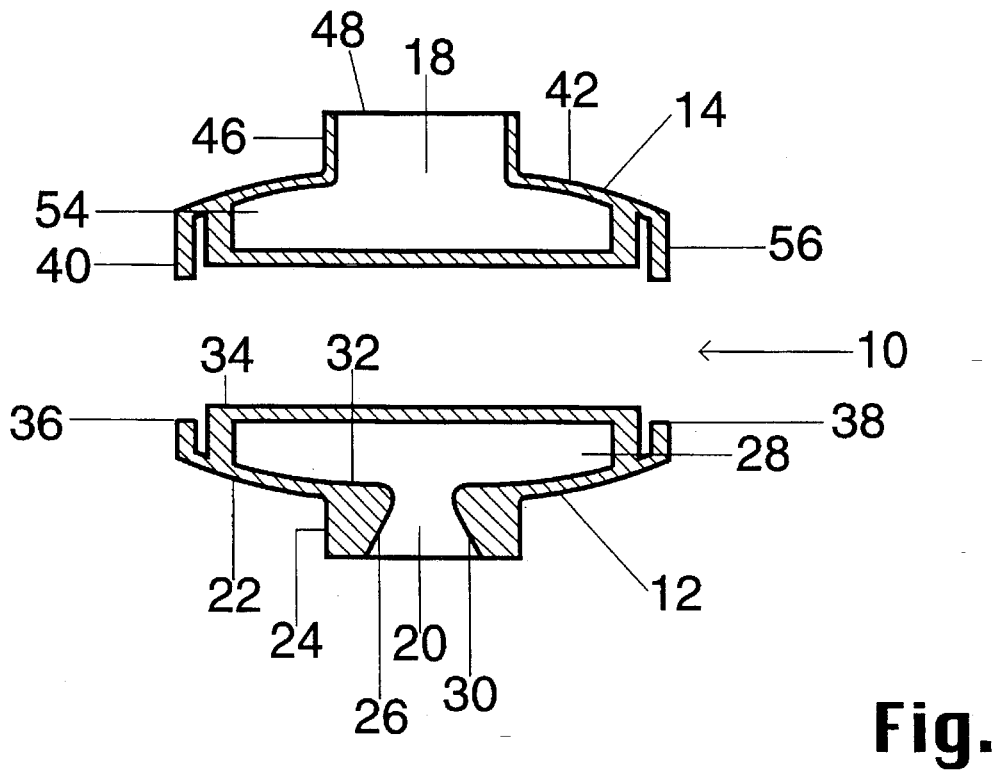
FIGS. 4 and 5 are cross-sectional views of the air filter unit with the housing members separated and secured together, respectively.

With regard to the housing members, the first housing member 12 includes an outer surface 22 with a conical shaped outlet port 20 extending from the center of the first housing member 12. The conical outlet port 20 includes a substantially cylindrical outer surface 24 and a conically shaped inner surface 26 which is best viewed in FIGS. 4 and 5. The conically shaped inner surface 26 widens as it extends from the interior 28 of the first housing member 12 to the end 30 of the conical outlet port 20. This shape distributes the air flowing through the outlet port 20 to create a conically shaped airflow (see FIG. 1) which showers the passenger sitting below the air filter unit 10. The conically shaped air flow creates an umbrella which showers the passenger with filtered air, while protecting the passenger from ambient air circulating within the cabin of the aircraft.

With regard to the interior 28 of the first housing member 12, an inner surface 32 is provided which forms half of the enclosure containing the filter medium 16. The inner surface is constructed with a ledge 34 to support the filter medium 16 which is sized to snugly fit within the interior of the housing. The first housing member 12 is provided with an outer edge 36 including a lip 38 designed to engage the outer edge 40 of the second housing member 14.

The second housing member 14 is constructed similar to the first housing member 12. As with the first housing member 12, the second housing member 14 has a substantially convex outer surface 42 with a centrally located inlet port 18. A connecting member 46 is formed about the inlet port 18. The connecting member 46 is substantially cylindrical and includes a central opening 48 sized to snugly fit over the outlet 50 of the ventilation control nozzle 52. As with the first housing member 12, the interior 54 of the second housing member 14 includes a ledge 56 for supporting the filter 16 which is sized to snugly fit within the interior of the housing. The second housing member 14 also includes an outer edge 40 having a lip 58 designed to engage the lip 38 of the first housing member 12.

The air filter unit 10 is easily constructed. The filter medium 16 is placed on either the ledge 34 of the first housing member 12 or the ledge 56 of the second housing member 14. The lip 38 of the first housing member 12 is then brought into engagement with the lip 58 of the second housing member 14 to form a securely sealed housing for the filter medium 16. This simple assembly method permits the filter medium to readily be replaced when deemed necessary. The old filter medium is simply removed by pulling the first and second housings apart until the filter medium is revealed. The old filter medium is then removed and a new filter medium is place on the ledge of either housing member before bringing the housings together to form an enclosure for the filter medium.

In use, the air filter unit 10 is frictionally attached to the outlet 50 of the ventilation control nozzle 52 of a passenger aircraft. As stated previously, the ventilation control nozzle 52 is generally part of the passenger support unit 60. The passenger support unit generally includes an air control nozzle, reading light, emergency oxygen mask and air flow control knobs. The air filter unit 10 is attached to the ventilation control nozzle 52 by placing the connecting member 46 over the outer surface 62 of the ventilation control nozzle 52 until the inner surface 64 of the connecting member 46 frictionally engages the outer surface 62 of the ventilation control nozzle 52 sufficiently to hold the air filter unit 10 in position. Once the air filter unit is properly positioned, air forced through the ventilation control nozzle passes through the air filter unit and out the conical outlet port to form an umbrella of fresh filtered air around the passenger. Specifically, the air forced through the ventilation control nozzle passes into the second housing member and then through the filter medium. The air is then forced through the interior of the first housing member and out the conical outlet port. The conically shaped inner surface of the conical outlet port distributes the air passing therethrough to create a conically shaped flow of the filtered air. The flow creates an umbrella showering the passenger with filtered air, while preventing the passenger from unfiltered air that might be circulating through the cabin of the aircraft. Air flow through the air filter unit is also improved by providing the inlet port with an inner diameter larger than the inner diameter of the outlet port.

While the preferred embodiment of the air filter unit is constructed with a rectangularly shaped, the housing could take a variety of shapes without departing from spirit of the present invention. For example, a circular embodiment of the present invention is shown in FIGS. 6a, 6b and 6c and 6d. As with the rectangular embodiment, the disclosed air filter unit 10' includes a first housing member 12' with a conical outlet port 20', a second housing member with an inlet port 18' and a circular filter medium 16' sized to fit snugly between the first housing member 12' and the second housing member 14'. With the exception of the shape of the housing members, they are structurally identical to the housing members previously disclosed with reference to FIGS. 1–5.

Additionally, the preferred embodiment discloses first and second housing members frictionally held together, permitting removal and replacement of the filter medium. However, the first and second housing members could be permanently bonded together at their edges to create a fully disposable air filter unit. The members could be bonded together by any conventional means, including adhesive, thermal bonding, retaining members, etc.

while various preferred embodiments have been shown and described, it will be understood that there is no intent to limit the invention by such disclosure, but rather, is intended to cover all modifications and alternate constructions falling within the spirit and scope of the invention as defined in the appended claims.

I claim:

1. A method of filtering air entering into the cabin of an aircraft over an individual passenger seat via an air control nozzle comprising the steps of:

sizing an inlet port of a filter housing to frictionally engage an air ventilation nozzle used to direct an air flow into a passenger space of an aircraft;

securing a filter within said housing; and, placing said housing over said air ventilation nozzle to filter air entraining therethrough.

2. The method according to claim 1, further including the step of shaping the housing to create an evenly dispersed air flow into the passenger space.

3. The method according to claim 2, wherein the housing includes a conically shaped outlet.

4. In combination with an air ventilation control nozzle in the cabin of an aircraft for directing an air flow into a passenger space of the aircraft, an air filter unit including a housing; said housing having an inlet port sized to frictionally engage said air ventilation control nozzle and a filter medium located within said housing to filter air being entrained therethrough and an outlet for directing air about a seated passenger.

5. The combination according to claim 4, wherein said filter housing includes a shaped inner surface evenly dispersing air flowing therethrough into the passenger space.

6. The combination according to claim 5, further including a conical shape on said inner surface of said outlet.

7. An air filter unit for use with an air ventilation control nozzle in the cabin of an aircraft, comprising:

a housing containing a filter medium, said filter medium having a first side and a second side; and, said housing including an inlet port positioned on said first side of said filter medium and an outlet port positioned on said second side of the said filter medium, wherein said inlet port includes a connecting member having an inner surface dimensioned to frictionally engage the circumference of the ventilation control nozzle.

8. The air filter unit according to claim 7, wherein said outlet port has a conically shaped interior surface, said interior surface being oriented such said conically shaped interior surface widens as it extends from said filter to create a distributed air flow which will shower an individual sitting below said air filter unit.

9. The air filter unit according to claim 7, wherein said housing includes a first housing member and a second housing member, said first housing member and said second housing member being releasable engageable to form said housing.

10. The air filter unit according to claim 9, wherein said filter medium is releasably stored between said first housing member and said second housing member.

11. The air filter unit according to claim 7, wherein said housing includes a first housing member and a second housing member, and the first housing member is bonded to said second housing member in order to permanently secure the filter medium therein.

12. The air filter unit according to claim 11, wherein said filter medium is stored between said first housing member and said second housing member.

13. The air filter unit according to claim 7, wherein said housing is rectangular.

14. The air filter unit according to claim 7, wherein said inlet port has a larger internal diameter than the outlet port.

\* \* \* \* \*